(12) United States Patent
Gebhart

(10) Patent No.: US 8,261,997 B2
(45) Date of Patent: Sep. 11, 2012

(54) SURFACE-TOLERANT RFID TRANSPONDER DEVICE

(75) Inventor: Michael Gebhart, Linz (AT)

(73) Assignee: NXP B.V., Eindhoven (NL)

( * ) Notice: Subject to any disclaimer, the term of this patent is extended or adjusted under 35 U.S.C. 154(b) by 10 days.

(21) Appl. No.: 12/884,555

(22) Filed: Sep. 17, 2010

(65) Prior Publication Data

US 2011/0068178 A1    Mar. 24, 2011

(30) Foreign Application Priority Data

Sep. 17, 2009   (EP) .................................... 9170539 A

(51) Int. Cl.
*G06K 19/06*   (2006.01)
*G06K 19/00*   (2006.01)

(52) U.S. Cl. ........................................ 235/492; 235/487

(58) Field of Classification Search .................. 235/380, 235/487, 492

See application file for complete search history.

(56) References Cited

U.S. PATENT DOCUMENTS

| | | | | |
|---|---|---|---|---|
| 7,545,336 | B2 * | 6/2009 | Naito | 343/788 |
| 2004/0075616 | A1 * | 4/2004 | Endo et al. | 343/895 |
| 2007/0252771 | A1 * | 11/2007 | Maezawa et al. | 343/841 |
| 2010/0219252 | A1 * | 9/2010 | Kikuchi et al. | 235/488 |
| 2011/0036912 | A1 * | 2/2011 | Guo et al. | 235/492 |

FOREIGN PATENT DOCUMENTS

| | | |
|---|---|---|
| EP | 1 347 533 A1 | 9/2003 |
| EP | 1 819 211 A1 | 8/2007 |
| EP | 1 988 491 A1 | 11/2008 |

OTHER PUBLICATIONS

European Extended Search Report for Patent Appln. No. 09170539.2 (Mar. 24, 2010).

* cited by examiner

*Primary Examiner* — Thien M. Le
*Assistant Examiner* — April Taylor

(57) ABSTRACT

A carrier assembly for receiving an RFID transponder chip has an attachment side for being attached to a consumer device and an operation side for receiving an RF signal in operational use of the RFID transponder chip.

14 Claims, 4 Drawing Sheets

SURFACE-TOLERANT RFID TRANSPONDER DEVICE

This application claims the priority of European patent application no. 09170539.2, filed on Sep. 17, 2009, the contents of which are incorporated by reference herein.

BACKGROUND OF THE INVENTION

Today, a huge amount of personal cards is in practical use, with an increasing focus on applications requiring higher security. RFID technology was implemented as a comfortable interface for the user and world-wide standardized about one decade ago in the ISO/IEC14443 Proximity Standard. This standard, as well as all other standards in the field of RFID are considered to be well-known to the person skilled in the art. RFID technology enabled electronic passports, contactless credit cards (E-banking), access control or public transport ticketing as successful solutions being part of our daily life. The typical format of such cards is ID-1, specified in the ISO/IEC7810 standard.

A new trend is visible wherein RFID technology is being used for payment applications. In such applications contactless stickers with ISO/IEC14443 smartcard transponder chips are sticked to mobile phones, for example. Mobile Phones may have cases made of plastic, containing metal parts, or consist of metal, and may have different sizes. A typical transponder card attached to a metal plate will not operate properly, because the magnetic flux passing through the antenna coil will produce eddy currents in the metal, and these will produce an opposite H-field, which practically cancels out completely the Reader field. Thus, the contactless transponder gets no energy for operation. A ferrite foil in-between transponder loop antenna and metal case will allow a part of the magnetic flux to pass through the foil, and not contribute to the eddy currents. The result is that some H-field remains to power the transponder and allow (limited) operation. Such contactless systems operate with resonance to increase induced voltage. The antenna design must meet the criterion that resonance frequency is close to the operating carrier frequency, to have most energy. Loop antennas with ferrite will be detuned in different way by the presence of metal or plastic (~3 MHz for a practical case).

A problem of the known RFID transponder is that it is no longer applicable to any surface material once it has been optimized for one surface material (for example metal). Such optimization is done in the manufacturing stage of the RFID transponder.

SUMMARY OF THE INVENTION

A first feature in accordance with the invention relates to a carrier assembly for receiving an RFID transponder chip, the carrier assembly having an attachment side for being attached to a consumer device, and having an operation side for receiving an RF signal in operational use of the RFID transponder chip. The carrier assembly comprises a layer stack that includes an antenna layer, a magnetic layer, and an electrically conductive shielding layer. The antenna layer is arranged between the operation side and the magnetic layer. The electrically conductive shielding layer is arranged between the magnetic layer and the attachment side. The antenna layer comprises an antenna having contacts for being coupled to the RFID transponder chip.

The carrier assembly is configured for receiving an RFID transponder chip. In operational use the RFID transponder chip is mounted to the carrier assembly such that its contacts are connected to the antenna contacts which completes the respective RF circuit. The antenna is required for receiving an RF signal from an RFID-reader. Besides information contained in the signal the energy contained in this signal is used for powering the transponder chip such that it may transmit information back to the RFID-reader via the same antenna. The carrier assembly may have the form of a sticker (based upon a paper or plastic substrate) or a flexible card. In operational use the carrier assembly is typically provided on a surface of a product or on or in a package. The magnetic layer ensures that the antenna layer may collect energy even if the RFID transponder is directly provided on a metal surface. It allows a part of the magnetic flux to pass through the magnetic layer and not contribute to Eddy currents. As a result some magnetic field remains to power the transponder and allow operation. Despite the presence of the magnetic layer detuning of the resonance frequency of the antenna occurs, i.e. the total inductance (self-inductance plus mutual inductance) of the antenna is affected by the presence of the material (having magnetic properties) on which the RFID transponder is provided. Expressed differently, a different material will result in a different total inductance and thus in a different detuning of the resonance frequency. It must be noted that the operating carrier frequency is generally standardized, it is 13.56 MHz in the ISO/IEC14443 standard, for example. For best energy transfer, the resonance frequency should be equal or very close to the operating carrier frequency. Therefore, deviation of the resonance frequency must be prevented. In the prior art detuning of the resonance frequency is taken into account by taking the magnetic properties of the target material into account while designing the antenna. Hence, for different target materials (metal, plastic, etc) different antenna designs have to be manufactured. In the invention there is provided an electrically conductive shielding layer at the attachment side. The effect of this layer is that it effectively shields the transponder from the material of the surface on which the transponder is to be provided. The shielding layer has some detuning effect on the resonance frequency, but once this detuning effect has been taken into account in the antenna design, there is hardly any further detuning effect due to the surface on which the RFID transponder is provided, i.e. the RFID transponder comprising the carrier assembly of the invention is suitable for virtually any surface.

An outer contour of a first projection of the antenna in a direction perpendicular to the antenna layer fully encloses an outer contour of a second projection of the electrically conductive shielding layer in the direction perpendicular to the antenna layer. Optionally, an outer contour of a third projection of the magnetic layer in the direction perpendicular to the antenna layer fully encloses the outer contour of the first projection of the antenna in the direction perpendicular to the antenna layer. The magnetic flux which runs through the antenna is better guided to the space outside the transponder, which, as a result, reduces the eddy currents created by the magnetic flux in the shielding layer.

These and other aspects of the invention are apparent from and will be elucidated with reference to the embodiments described hereinafter.

LIST OF REFERENCE NUMERALS

Figure 1:
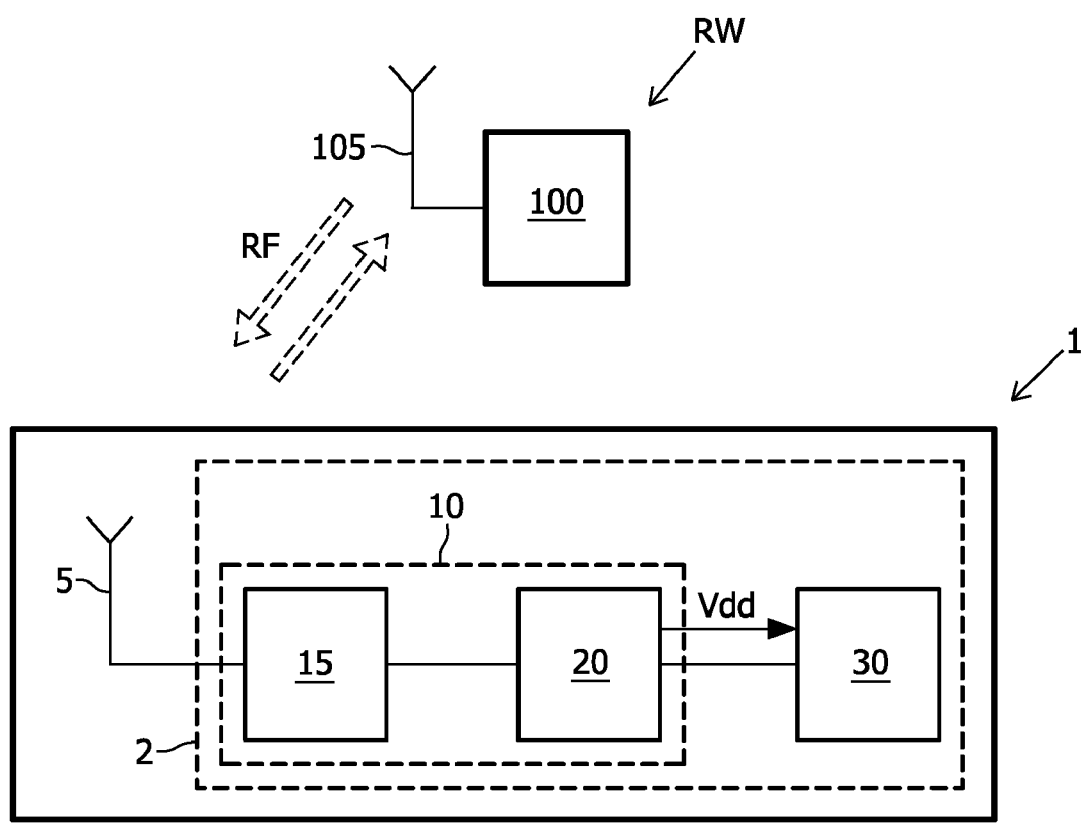
FIG. 1 shows a possible RFID system as known from the prior art.

RW RFID-reader
1 RFID tag
2 RFID transponder chip
5 tag antenna
10 analog front-end
15 matching circuit
20 rectifier circuit
30 electronic circuit (of RFID tag)
100 electric circuit (of RFID-reader)
105 further antenna (of RFID-reader)
Vdd supply voltage
FL1 antenna foil
FL2 ferrite foil
50 antenna layer/antenna
51 outer contour antenna
60 first substrate layer
70 ferrite layer (magnetic layer)
71 outer contour ferrite layer
80/PP second substrate layer (passepartout)
90 shielding layer
91 outer contour shielding layer
99 RFID carrier assembly
T1 first antenna terminal
T2 second antenna terminal
S1 operation side
S2 attachment side
FCS front cover sheet
BCS back cover sheet

DETAILED DESCRIPTION

In an embodiment of the carrier assembly in accordance with the invention the magnetic layer has a relative magnetic permeability larger than or equal to 30, and preferably larger than 50, and even more preferably larger than 100.

In an embodiment of the carrier assembly in accordance with the invention the magnetic layer comprises a ferrite foil or a ferrite plate. Ferrite is a very advantageous material for being used as a magnetic layer. Ferrite plates or foils are particularly advantageous for 13.56 MHz RFID transponders. An example of a commercially available ferrite foil is the Flexield™ foil from TDK. More information on this foil is found on Flexield™ datasheets which are available on the following website: http://www.tdk.co.jp/. These datasheets are hereby incorporated by reference in its entirety.

In an embodiment of the carrier assembly in accordance with the invention the magnetic layer has a thickness larger than 50 µm, and preferably larger than 100 µm. A thicker magnetic layer results in more flux guiding capacity. Alternatively, a thicker magnetic layer allows for using materials having a smaller relative magnetic permeability.

In an embodiment of the carrier assembly in accordance with the invention the electrically conductive shielding layer comprises a material selected from a group comprising: copper, aluminum, silver, gold, platinum, conductive paste, and silver ink. These materials are all suitable for being used as for the electrically conductive shielding and, moreover, are relatively easy to provide on the backside of the carrier assembly. Nevertheless, copper and aluminum have the additional advantage that they are very cheap.

In an embodiment of the carrier assembly in accordance with the invention the electrically conductive shielding layer has a thickness larger than 2 µm. A typical thickness for etched antenna conductors is 18 µm or 35 µm. In case of galvano-antennas the minimum thickness is about 2 µm.

In a second aspect, the invention relates to an RFID transponder device comprising a carrier assembly in accordance with the invention, and an RFID chip mounted to the carrier assembly. The combination of the carrier assembly and the RFID chip is also referred to as RFID transponder (device). Such RFID transponder may be provided in different formats, such as contactless transponder cards or contactless smartcards or proximity cards or stickers (sometimes also being referred to as RFID tag). These RFID transponder devices may be applied in various different applications of which a couple are mentioned in the embodiments discussed hereinafter.

In an embodiment of the RFID transponder device in accordance with the invention the RFID transponder device comprises an RFID tag for being provided on the consumer device. Such RFID tag may advantageously replace the well-known barcodes for example. Furthermore, they may be used for contactless payment applications.

In an embodiment of the RFID transponder device in accordance with the invention the RFID transponder device comprises an RFID card for being provided in the consumer device.

In a third aspect the invention relates to a consumer device comprising a RFID transponder device in accordance with the invention.

In an embodiment of the consumer device in accordance with the invention the RFID transponder device is configured for contactless payment applications. The application area of this embodiment is also referred to as contactless stickers. With contactless payment applications is meant here is that a consumer device, such as a mobile phone (very suitable choice because most people already possess one), is provided with credit card functionality, i.e. the (contactless) credit card has been provided on or in the mobile phone, such that a user always carries his credit card with him/her for payment on a terminal offering the contactless reader interface.

Contactless stickers with ISO/IEC14443 smartCard transponder chips sticked to mobile phones e.g. for Payment applications are becoming a new trend. Mobile phone cases may consist of plastic or metal, this will in some cases prevent the function of contactless transponders. In this invention the idea is to produce a material structure consisting of loop antenna (for receiving an RFID chip), a ferrite foil (or plate), and a conductive backplane (shielding layer). For the case of a sticker on a mobile phone with a metal case, a part of the magnetic flux will be guided through the ferrite foil (and so this part of flux will not produce eddy currents in the metal resulting in an opposite H-field). This part of the flux allows inducing some voltage in the transponder loop antenna, so that the transponder can operate. The electrically conductive backplane allows designing the antenna resonance frequency to an optimum value close to the 13.56 MHz operating carrier frequency for all operation cases, either with a metal case or a plastic case. This means good device operation that is (nearly) independent of the object material properties. Furthermore, the metal backplane will act as an electric shielding and reduce disturbance of the RFID transponder caused by unwanted emissions of the mobile phone at intermediate frequencies (IF) or other frequencies. The conventional RFID transponder construction suffers much more from de-tuning and only allows to optimize the performance either for one surface material only (for example for free air operation or for operation on metal). This will limit the use of such transponders. The transponder design of the invention allows to optimize for nearly all materials, as the transponder properties are nearly independent of the object (less detuning of resonance compared to the transponders in the prior art).

In order to facilitate the discussion of the detailed embodiments a few expressions are defined hereinafter.

Throughout this description the term "carrier assembly" refers to a carrier device onto which or into which an RFID transponder device is provided. Such carrier assembly may take the form of a sticker or a flexible card, for example.

Throughout this description the term "consumer device" refers to both electronic as well as non-electronic consumer products. In particular in the field of barcodes it is not essential that the device is electronic. RFID transponder cards are often integrated into or sticked onto electronic consumer devices, such as mobile phones.

FIG. 1 shows a possible RFID system as known from the prior art. The RFID system comprises an RFID tag (transponder) 1 and a RFID-reader RW for reading and/or writing the RFID-tag. The RFID tag 1 comprises a tag antenna 5 for receiving an RF signal from the RFID-reader RW, a front-end circuit 10, and an electronic circuit 30. The tag antenna 5 is electrically connected to the front-end circuit 10, and the front-end circuit 10 is electrically connected to the electronic circuit 30. The electronic circuit 30 comprises different components, such as: coding and decoding circuitry (not shown), a digital circuit or processing unit (not shown), and a memory block (not shown) for storing specific data, i.e. identification data. The front-end circuit 10 and the electronic circuit are typically comprised in an RFID transponder chip 2, whereas the tag antenna 5 is typically provided on a carrier assembly on which the RFID transponder chip 2 is mounted. The front-end circuit 10 comprises a matching circuit 15 that is electrically connected between the tag antenna 5 and a rectifier circuit 20. The matching circuit 15 is arranged for impedance-matching of the tag antenna 5. An output signal (still an RF signal) of the matching circuit 15 is supplied to the rectifier circuit 20. The main task of the rectifier circuit 20 is to convert the RF output signal of the matching circuit 15 into a supply voltage Vdd (DC-voltage) for the electronic circuit 30. To this end the rectifier circuit 15 comprises a rectifying stage (not shown). In some RFID tags, this rectifying stage is merged with a charge-pump stage (not-shown) in order to boost the supply voltage Vdd on the output (the input power may be very low) This also depends on the operating frequency. For UHF-RFID (880-950 MHz) such charge-pump is a critical element. For 13 MHz RFID, no charge-pump is used, because under typical conditions the voltage from the antenna is high enough. Also, the rectifier circuit 15 may comprise a stabilization stage (not shown) for stabilizing the supply voltage Vdd on the output (the input power may be strongly fluctuating). This block is sometimes also being referred to as voltage limiter in the prior art. In 13 MHz RFID the voltage limiter is a critical element. Some of the most common problems encountered when designing the analog front-end 10 of the RFID-tag 1 are: i) the matching properties of the matching circuit 15 with the tag antenna 5, ii) the power consumption in the rectifier circuit 20, and iii) the low conversion efficiency of the rectifier circuit 20. The components and the operation of the RFID tag 1 are well-known to the person skilled in the art and are not discussed in more detail in this description. Also, variations of the RFID tag 1 have been disclosed in the prior art.

The RFID reader RW comprises a further antenna 105 and an electric circuit 100. The components and the operation of the RFID reader RW are well-known to the person skilled in the art and are not discussed in more detail in this description.

Figure 2A:
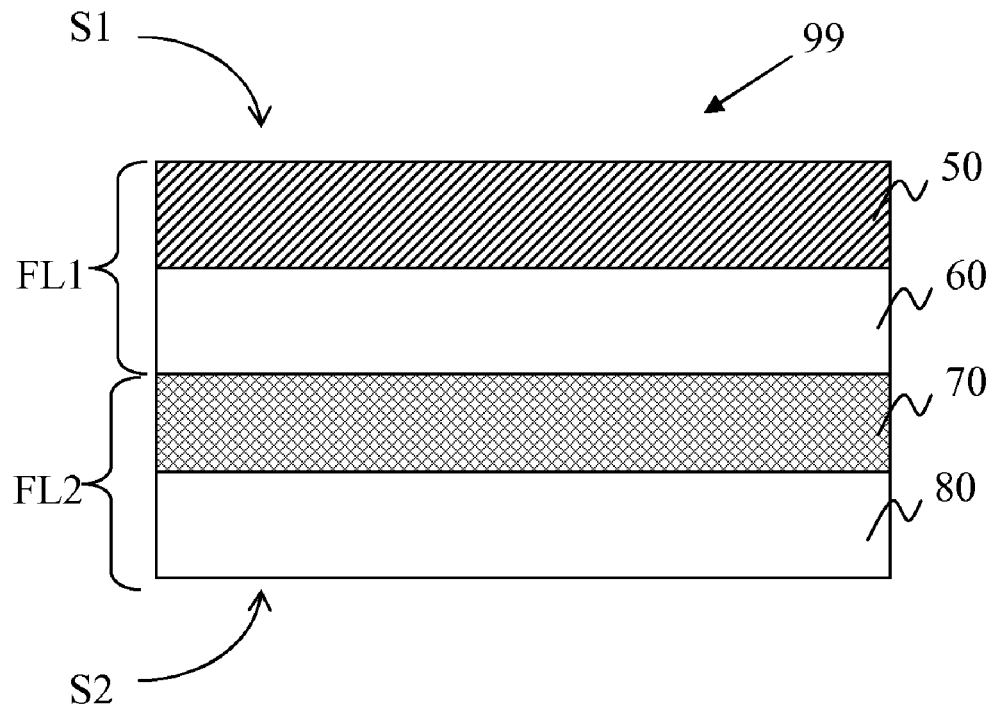
FIG. 2a shows a schematic cross-sectional view of part of an RFID carrier assembly for an RFID chip as known from the prior art.

FIG. 2a shows a schematic cross-sectional view of part of an RFID carrier assembly for an RFID chip as known from the prior art. The carrier assembly 99 comprises an antenna foil FL1 and ferrite foil FL2. The antenna foil FL1 comprises a first substrate layer 60 onto which an antenna layer 50 has been provided. The antenna layer 50 is typically structured/patterned (not shown) and comprises an antenna. The ferrite foil FL2 comprises a magnetic layer (ferrite layer) 70 and a second substrate layer 80 in this example embodiment. The ferrite foil FL2 is provided on a backside of the first substrate layer 60. The ferrite foil Fl2 may be the earlier-mentioned Flexield™ foil from TDK, for example. As already mentioned, the purpose of this magnetic layer 70 is to enable the use of an RFID transponder comprising such carrier assembly 99 on metal (electrically conductive) surfaces. The antenna layer 50 is located on a operation side of the carrier assembly 99, i.e. the side being arranged for receiving the RF signal from the RFID reader RW. The RFID transponder chip 2 is typically provided on the operation side S1 as well (more details about this aspect are given later in the description) Opposite to the operation side S1 there is the attachment side S2 of the RFID carrier assembly 99. This side is typically attached to a consumer device (not shown) by means of an adhesive layer, for example. The layer stack of FIG. 2a may also be embedded in further cover sheets (not shown). The second substrate layer 80 is not essential for the invention. In this embodiment is merely serves as a carrier for the magnetic layer 70. In other embodiments it may be skipped completely, but other options exists as well, such as using a passepartout around the magnetic layer 70.

For the manufacturing of the antenna foil FL1 at least four different technologies can be used, namely: embedded wire technology, etched antenna technology, galvano antenna technology, and printed antenna technology. As such these technologies are to be considered well-known to the person skilled in the art). More information about these technologies is to be found in the book of Dominique Paret, "*RFID and Contactless SmartCard applications*", Wiley, ISBN 0470011955, but also in the "*RFID Handbook*" of Klaus Finkenzeller, Carl Hanser Verlag München Wien, ISBN 3-446-22071-2 incorporated herein by reference.

Figure 2B:
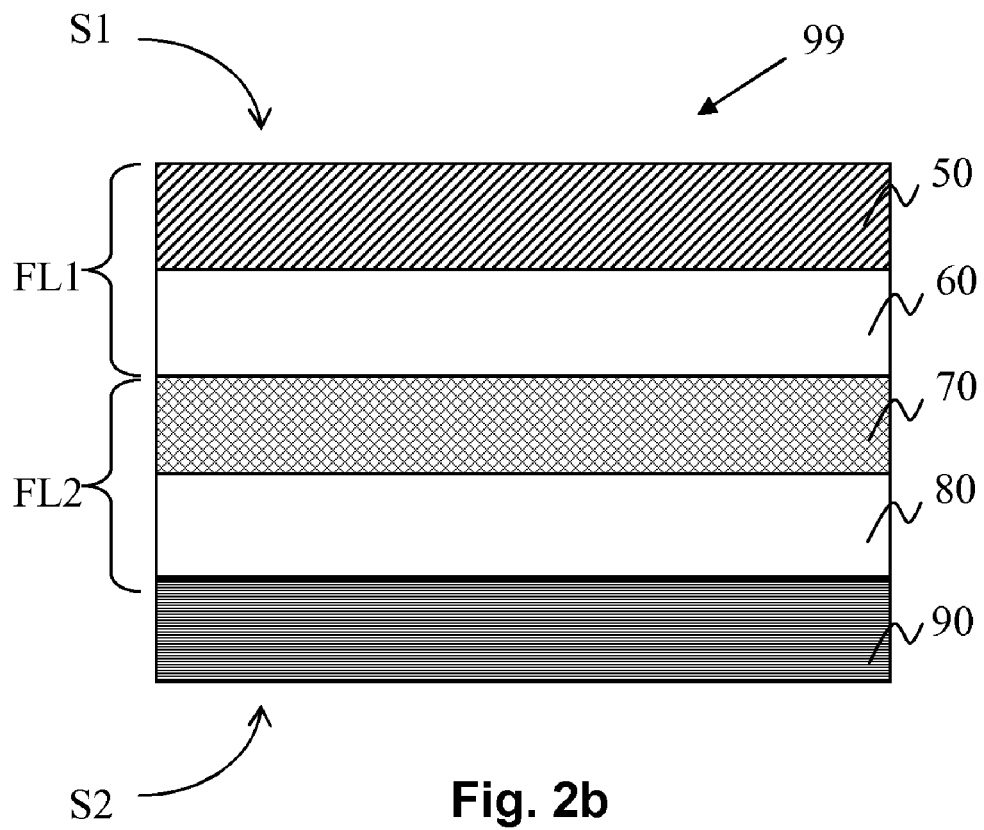
FIG. 2b shows a schematic cross-sectional view of part of an RFID carrier assembly for an RFID chip according to a first embodiment of the invention.

FIG. 2b shows a schematic cross-sectional view of part of an RFID carrier assembly for an RFID chip according to a first embodiment of the invention.

This figure will be discussed in as far as it differs from FIG. 2a. At the attachment side S2 of the RFID carrier assembly 99 there is provided an electrically conductive shielding layer 90. In this example the shielding layer comprises copper (may be referred to as copper backplane). A typical thickness is 18 µm or 35 µm in case of copper. A minimum thickness is in the order of 2 µm, which may be producible with galvano-antenna technology. As already mentioned the purpose of the shielding layer 90 is to make the detuning effect of the RFID transponder less dependent from the environment, i.e. to make the RFID transponder suitable for being used on different surfaces having different materials, even though the RFID transponder has only been optimized for once specific situation. The first substrate layer 60 and the second substrate layer 70 may comprise polyvinylchloride (PVC) for example.

The stacking of the layers in FIGS. 2a and 2b may be carried out using reel-to-reel lamination processes. In such process the individual layers are typically attached to each other using thermocompression (for example by keeping the layers under pressure at 190° C. for a duration of 5 minutes).

Figure 3:
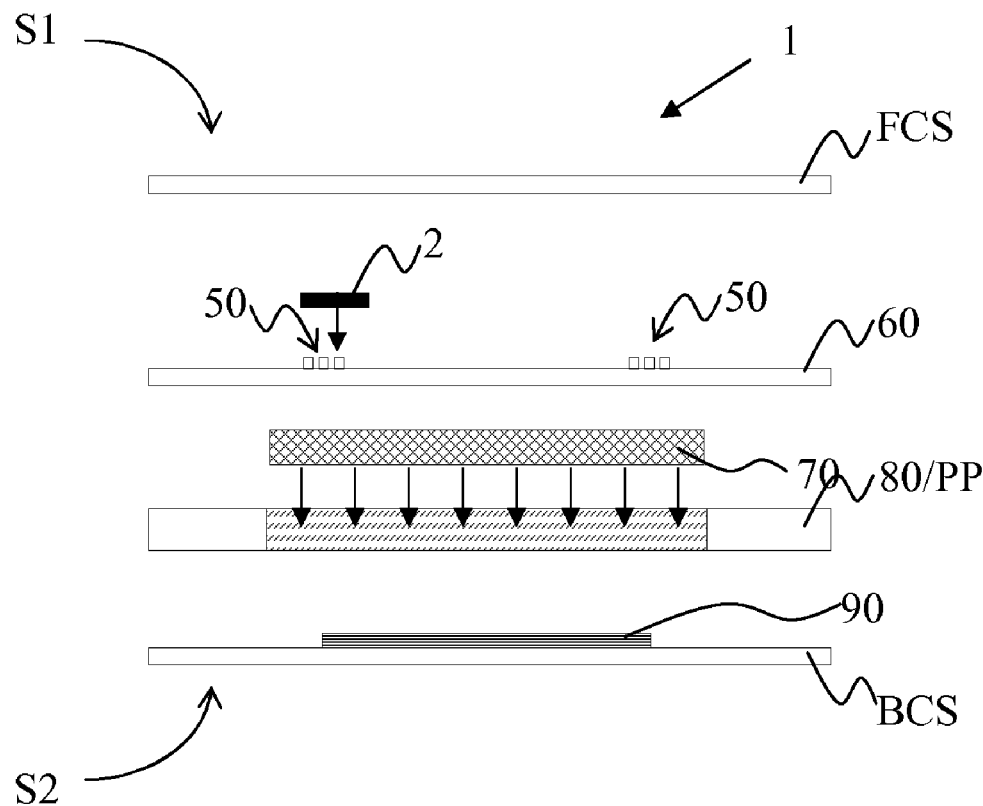
FIG. 3 shows an exploded view of an RFID transponder device including the RFID carrier assembly and the RFID chip.

FIG. 3 shows an exploded view of an RFID transponder device including the RFID carrier assembly and the RFID chip. At the operation side S1 there is further provided a front cover sheet FCS which covers the RFID chip 2, the antenna 50 and the first substrate layer 60. At the attachment side S2 there is further provided a back cover sheet BCS (here a copper layer) which covers a passepartout PP, which is used instead of the second substrate layer 80. Within the passepartout PP there is a recess for receiving a ferrite plate 70, such as the Ferrite TDK IBF-10-0.1. The ferrite plate is preferably thicker than 100 μm. The relative magnetic permeability is preferably larger than 30, even more preferably larger than 50, and most preferably larger than 100. The magnetic field guiding effect is approximately proportional to the product of the magnetic layer thickness and its relative magnetic permeability.

Figure 4A:
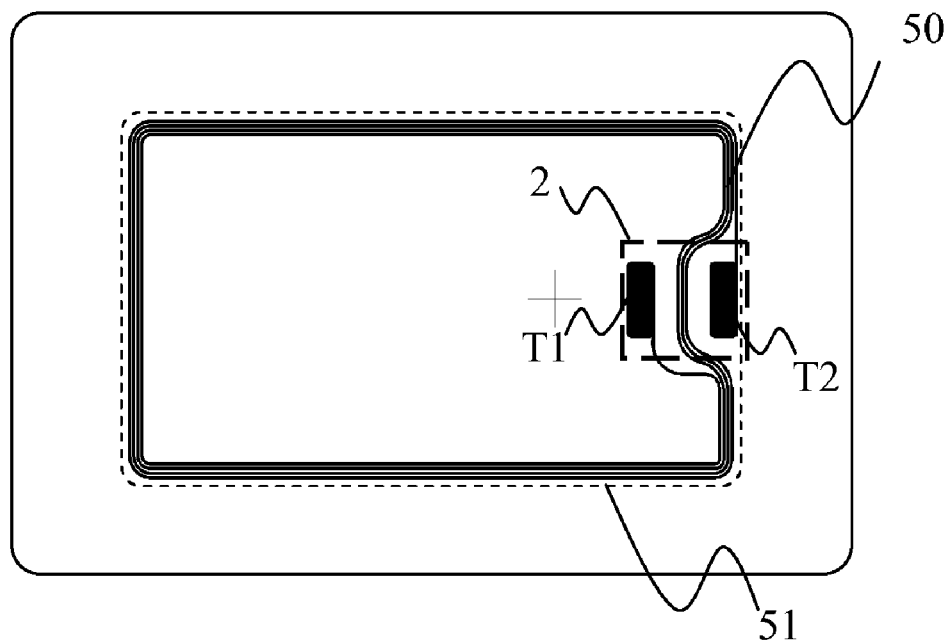
FIGS. 4a to 4c illustrate schematic transparent layout views of an RFID transponder device according to a second embodiment of the invention.
Figure 4B:
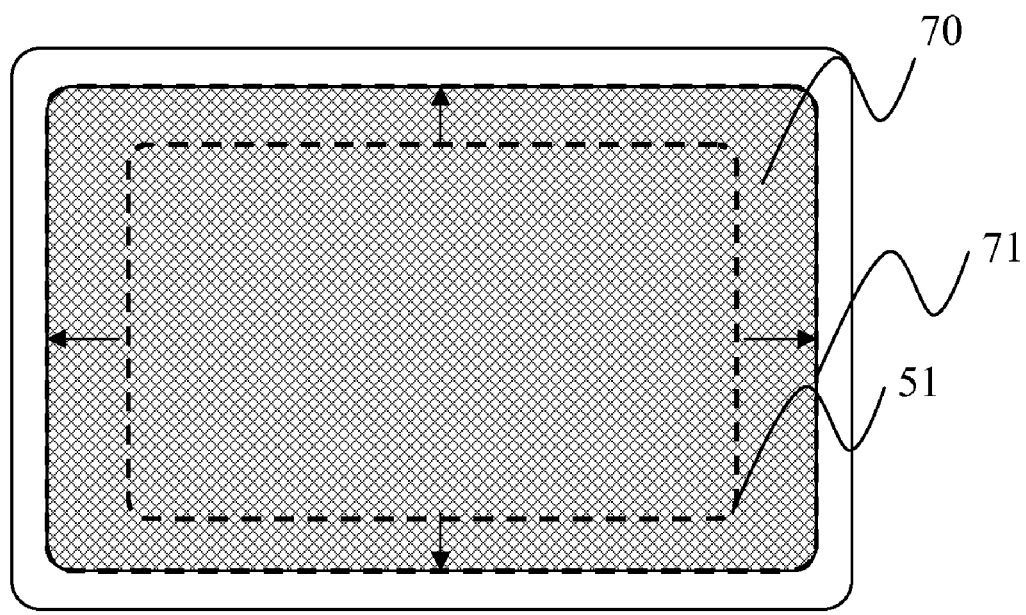
Figure 4C:
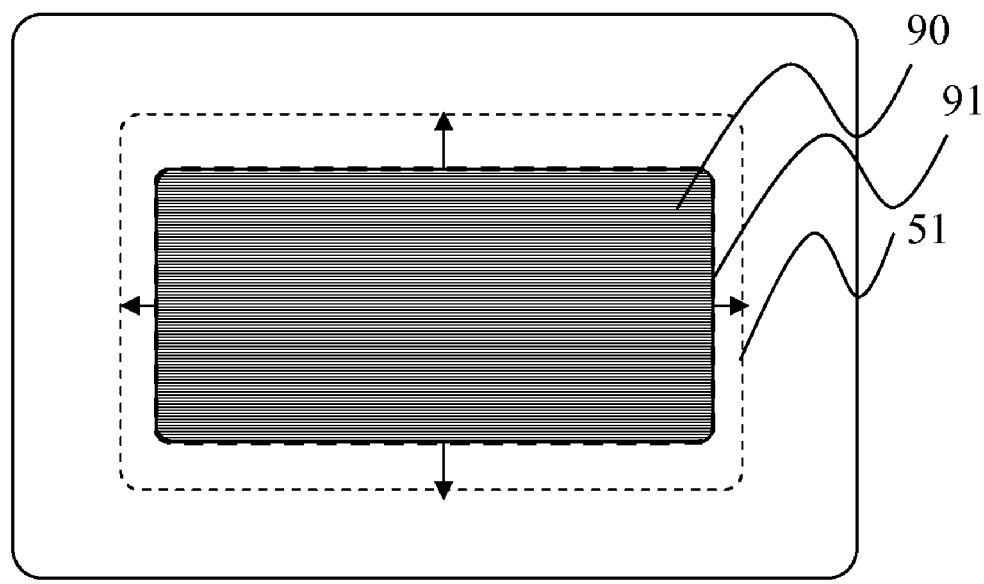

FIGS. 4a to 4c illustrate schematic transparent layout views of an RFID transponder device according to a second embodiment of the invention. FIG. 4a shows a transparent layout view of the RFID transponder device. It shows the antenna 50 which comprises a number of loops and ends up into a first antenna terminal T1 and a second antenna terminal T2. The antenna terminals T1, T2 are configured for being connected with pins of an RFID transponder chip 2. FIG. 4a also shows an outer contour 51 of the antenna 50. FIG. 4b shows a transparent layout view of the RFID transponder device comprising the magnetic layer 70. The magnetic layer 70 has an outer contour 71 which fully encloses the outer contour 51 of the antenna. The advantage of this embodiment is that the magnetic flux is better confined within the magnetic layer 70 and guided in between the antenna layer and the object onto which the transponder is provided. The more the outer contour 71 of the magnetic layer 70 extends beyond the contour 51 of the antenna 50 the stronger this effect. A positive effect of this feature is that less magnetic flux will enter the object which results in less eddy currents (and thus a better performance). FIG. 4c shows a transparent layout view of the RFID transponder device further comprising the shielding layer 90. The magnetic layer 90 has an outer contour 91 which fully falls within the outer contour 51 of the antenna 50. The effect described with reference to FIG. 4b is further enhanced by this embodiment.

In an embodiment the dimensions of an RFID contactless smartcard sticker are: length 48.0 mm, width 28.0 mm. Furthermore, the dimensions of the outer contour of the antenna 50 are: length 44.0 mm, width 24.0 mm. Additionally, the dimensions of the magnetic layer 70 in FIG. 4b are: length 48.0 mm, width 28.0 mm (same as card dimensions). In the same embodiment, the dimensions of the shielding layer (metal backplane) in FIG. 4c are: length 42.0 mm, width 22.0 mm.

Here it must be noted that it also depends on the production process, if the ferrite may be as large as the complete sticker. For lamination, usually 2 mm on every border is reserved, which means the ferrite would have to be smaller, for example 44 mm×24 mm. To keep the same relations between the components, the antenna has to be smaller in that case, for example 40 mm×20 mm. At the time of writing this description there is no standard or specification for a sticker size. In practice, the size is determined by the costs (the smaller, the cheaper) and by the application logo which must find a place on the sticker as well. Thus, it cannot be too small (a certain minimum size is also required in order to have enough operating distance). Also the production machines require a certain minimum size in order to be able to handle the devices. When produced as part of a card, the RFID tag can be personalized on existing machines for cards and later the plastic part can be cut to a smaller size, as mainly the ferrite layer is very costly and plastic is very cheap).

The invention thus provides a carrier assembly 99 for receiving an RFID transponder chip 2, the carrier assembly 99 having an attachment side S2 for being attached to a consumer device. The carrier assembly 99 comprises: i) an antenna layer 50 comprising an antenna having contacts T1, T2 for being coupled to the RFID transponder chip 2; ii) a magnetic layer 70 covering at least part of an inner side of the antenna layer 50, wherein the inner side faces the attachment side S2, and iii) an electrically conductive shielding layer 90 covering at least part of the magnetic layer 70 at the attachment side S2 of the carrier assembly 99. The invention also provides an RFID transponder device comprising such carrier assembly, and to a consumer device comprising such RFID transponder device. The detuning effect due to the environment is made less dependent of the environment, i.e. the detuning due to the electrically conductive shielding layer 90 is dominant. The invention provides for an RFID transponder device which may be applied to virtually any surface, even though it has been optimized for only one situation.

The invention may be applied in various application areas. For example, the invention may be applied in RFID transponders. It must be noted that the invention is applicable to both active transponders as well as passive transponders. In passive transponders the magnetic layer in the invention ensures that there is enough power generated in the antenna by the magnetic field. In the active transponders (for example battery-powered) the magnetic layer also ensures that enough power can be transmitted by the antenna. In both transponders types the electrically conductive shielding layers ensures that the impedance of the antenna is better defined, i.e. less dependent on the environmental properties.

Various variations of the carrier assembly, RFID transponder and consumer device in accordance with the invention are possible and do not depart from the scope of the invention as claimed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. A carrier assembly for receiving an RFID transponder chip, the carrier assembly having an attachment side for being attached to a consumer device and having an operation side for receiving an RF signal in operational use of the RFID transponder chip, wherein:
- the carrier assembly comprises a layer stack that includes an antenna layer, a magnetic layer, and an electrically conductive shielding layer;
- the antenna layer is arranged between the operation side and the magnetic layer;
- the electrically conductive shielding layer is arranged between the magnetic layer and the attachment side;
- the antenna layer comprises an antenna having contacts for being coupled to the RFID transponder chip; and
- an outer contour of a first projection of the antenna in a direction perpendicular to the antenna layer fully encloses an outer contour of a second projection of the electrically conductive shielding layer in the direction perpendicular to the antenna layer.

2. The carrier assembly as claimed in claim 1, wherein an outer contour of a third projection of the magnetic layer in the direction perpendicular to the antenna layer fully encloses the outer contour of the first projection of the antenna in the direction perpendicular to the antenna layer.

3. The carrier assembly as claimed in claim 1, wherein the magnetic layer has a relative magnetic permeability larger than or equal to 30, and preferably larger than 50, and even more preferably larger than 100.

4. The carrier assembly as claimed in claim 1, wherein the magnetic layer comprises a ferrite foil or a ferrite plate.

5. The carrier assembly as claimed in claim 4, wherein the magnetic layer has a thickness larger than 50 μm, and preferably larger than 100 μm.

6. The carrier assembly as claimed in claim 1, wherein the electrically conductive shielding layer comprises a material selected from a group comprising: copper, aluminum, silver, gold, platinum, conductive paste, and silver ink.

7. The carrier assembly as claimed in claim 6, wherein the electrically conductive shielding layer has a thickness larger than 2 μm.

8. An RFID transponder device comprising a carrier assembly as claimed in claim 1, and an RFID chip mounted to the carrier assembly.

9. The RFID transponder device as claimed in claim 8, wherein the RFID transponder device comprises an RFID tag for being provided on the consumer device.

10. A consumer device comprising the RFID transponder device as claimed in claim 1.

11. The consumer device as claimed in claim 10, wherein the RFID transponder device is configured for contactless payment applications.

12. The carrier assembly as claimed in claim 1, further comprising a framing layer located between the antenna layer and the electrically conductive shielding layer, the framing layer having a recess for receiving the magnetic layer.

13. The carrier assembly as claimed in claim 12, wherein the magnetic layer is located within the recess of the framing layer.

14. The carrier assembly as claimed in claim 13, wherein the magnetic layer is a ferrite plate.

\* \* \* \* \*